L. BADGER.
ROLLER BEARING.
APPLICATION FILED NOV. 23, 1909.

990,946.

Patented May 2, 1911.
2 SHEETS—SHEET 2.

WITNESSES
G. Robert Thomas

INVENTOR
Luther Badger
BY
ATTORNEYS

UNITED STATES PATENT OFFICE.

LUTHER BADGER, OF ST. JOHNS, OREGON.

ROLLER-BEARING.

990,946.  Specification of Letters Patent.  Patented May 2, 1911.

Application filed November 23, 1909. Serial No. 529,529.

*To all whom it may concern:*

Be it known that I, LUTHER BADGER, a citizen of the United States, and a resident of St. Johns, in the county of Multnomah and State of Oregon, have invented a new and Improved Roller-Bearing, of which the following is a full, clear, and exact description.

The invention is an improvement in ball or roller bearings, the same being designed for general purposes, as, for example, car, locomotive, automobile and other vehicle wheels, and also machines of various characters.

The invention contemplates an anti-friction bearing capable of free working under end thrust in either direction, or a lateral strain, as that occasioned by the weight of the load, the bearing consisting of an inner and outer bearing member and an internally threaded bearing support, the inner bearing member increasing in diameter in passing from the ends toward the center and the outer bearing member composed of two sections threaded into the bearing support from the opposite sides thereof.

Reference is to be had to the accompanying drawings forming a part of this specification, in which similar characters of reference indicate corresponding parts in both views.

Figure 1:
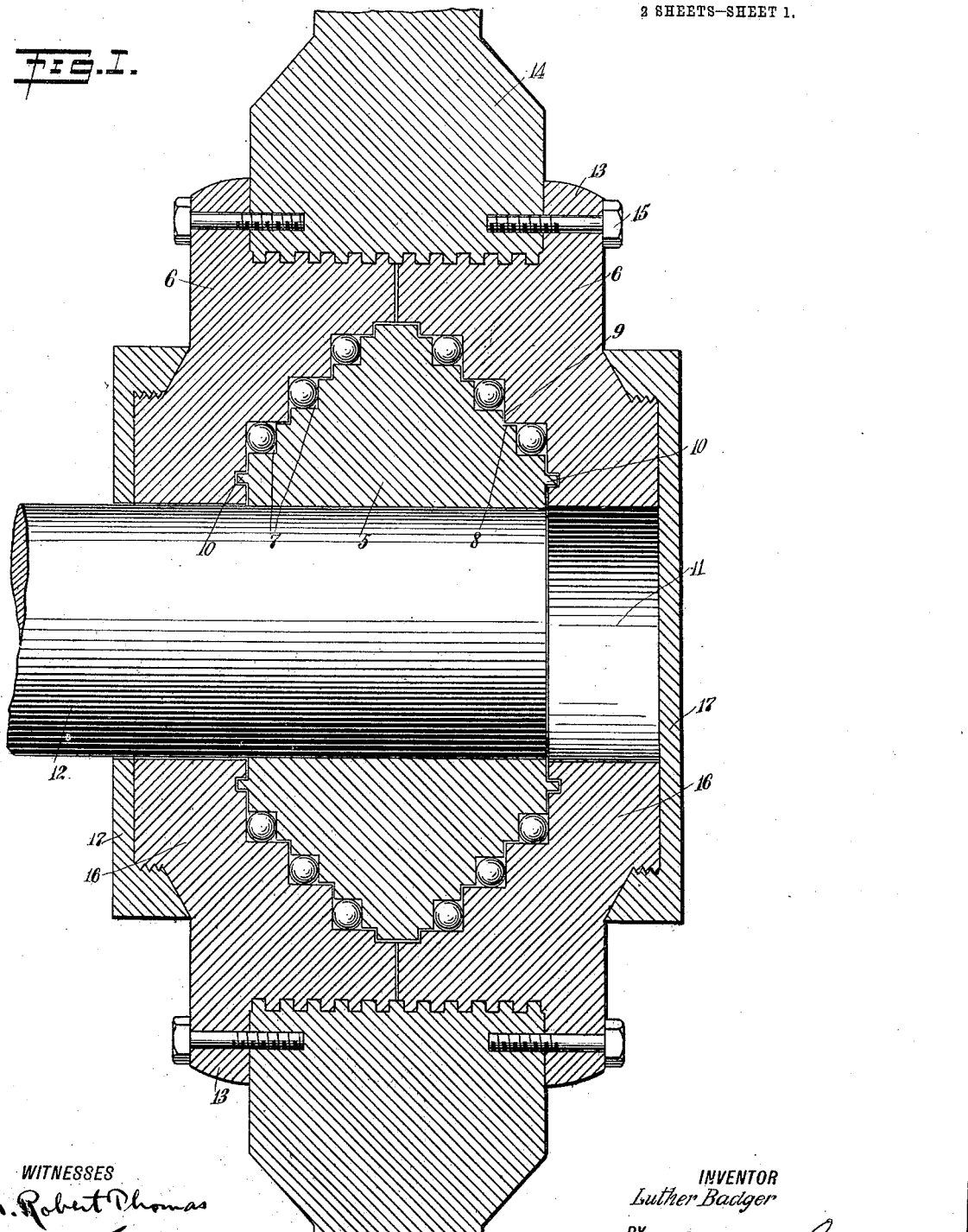
Figure 2:
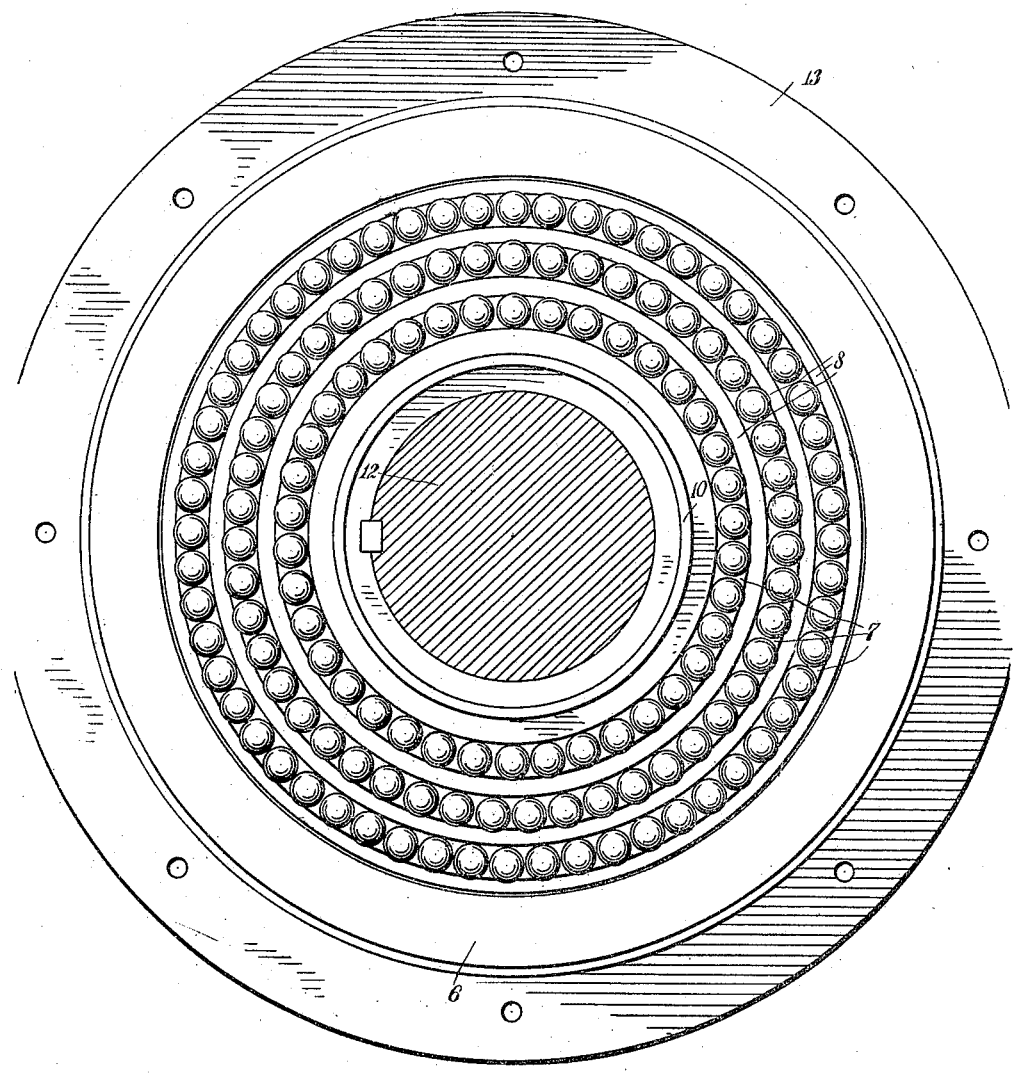

Figure 1 is a central longitudinal section of a bearing constructed in accordance with my invention; and Fig. 2 is an inner face view of the bearing, with one of the sections of the outer bearing member removed.

More specifically described, the bearing comprises an inner bearing member 5, and an outer bearing member composed of two heads or sections 6, 6, the inner bearing member having the general form of a double cone, with the enlarged portion at the center and inclining outwardly toward the center of the bearing in passing toward the ends, and the sections of the outer bearing member each covering one-half of the inner bearing member and abutting or meeting around the enlarged central portion of the latter. Between each side of the inner bearing member and adjacent section of the outer bearing member are provided annular roller raceways 7 arranged in stepped relation. For this purpose the opposed faces of the two bearing members are stepped, with steps 8 formed in the inner bearing member 5 intermediate of the steps formed in this member for the raceways, into which project the points or angles 9 of the steps of the outer bearing member, and serving to prevent the lubricant from freely passing from one roller raceway to another, these points or angles of the steps being slightly separated when the bearing is assembled, so that they can not rub together. For further retaining the oil or other lubricant within the roller or ball raceways, one of the bearing members, shown in the drawings to be the inner bearing member 5, is constructed with annular ribs 10, arranged at the ends and inwardly of the roller raceways and fitting within corresponding grooves formed in the other member.

The bearing has a central bore 11 to receive an axle, shaft or other like device 12 which is suitably fixed to the inner bearing member 5. The two sections of the outer bearing member 6 are externally threaded and each provided with an outer flange 13, the threaded portion of each section 6 being screwed into a wheel or other bearing support 14, with the flanges 13 of the two sections bearing against the opposite faces of the wheel and affixed thereto by bolts 15, the bearing when thus applied forming the hub of the wheel. To give the bearing a finish, each section of the bearing member is constructed with an outwardly-projecting externally-threaded boss 16 on which is screwed a cap 17, the cap preferably having an inwardly beveled edge bearing against the counterpart beveled portion of the outer bearing section. If desired, the axle or shaft 12 may terminate at the outer side of the inner bearing member, leaving a lubricant chamber in the outer section of the outer bearing member.

Having thus described my invention, I claim as new and desire to secure by Letters Patent:

The combination of inner and outer bearing members, the inner member increasing in diameter in passing from the ends toward the center, and the outer member composed of two sections joining around the enlarged portion of the inner member, said members having the opposed faces thereof stepped to form roller raceways, with the stepped portions of one of said members projecting into stepped portions of the other of said members arranged intermediate of the raceways.

In testimony whereof I have signed my name to this specification in the presence of the subscribing witnesses.

LUTHER BADGER.

Witnesses:
FRED B. REED,
ALFRED M. ESSON,
EUGENE S. WRIGHT.